United States Patent [19]
Vass

[11] 3,731,294
[45] May 1, 1973

[54] MONITORING SYSTEM

[75] Inventor: Leslie Vass, Bridgeport, Conn.

[73] Assignee: Harvey Hubbell, Incorporated, Bridgeport, Conn.

[22] Filed: Aug. 24, 1971

[21] Appl. No.: 174,422

[52] U.S. Cl.................340/213 R, 340/259, 340/420
[51] Int. Cl..............................................G08b 19/00
[58] Field of Search.....................340/213, 412, 414, 340/415, 420, 285, 268, 259, 267

[56] References Cited

UNITED STATES PATENTS

| | | | |
|---|---|---|---|
| 2,858,528 | 10/1958 | Diener, Jr. | 340/213 |
| 3,106,645 | 10/1963 | Kaufman | 340/213 |
| 3,184,725 | 5/1965 | Siegel et al. | 340/213 |
| 3,281,810 | 10/1966 | Thornberg | 340/213 |
| 3,484,770 | 12/1969 | Cheeseman | 340/213 |

Primary Examiner—Donald J. Yusko
Attorney—Armand Cifelli

[57] ABSTRACT

A monitoring system for manufacturing or processing operations which is highly flexible and adaptable to provide a number of diverse monitoring functions. The system includes a highly sensitive sensor having a pressure switch and a resistance probe which may be connected in a number of diverse ways to provide different combinations of sensing functions; a resistance bridge connected to the pressure switch and resistance probe which becomes unbalanced when the predetermined event is sensed; an amplifier for amplifying the unbalance of the bridge; and an electronic switch controlled by the resistance bridge to provide an output signal when the event is sensed. The output signal may be connected directly to an indicator and control section for indicating the sensed event or it may be coupled through a master timer under the control of a master sensor or clock. The indicator includes a latch and nonlatch mode and provides an output signal to a master control which, through appropriate contact logic, can initiate a variety of control functions as desired.

12 Claims, 4 Drawing Figures

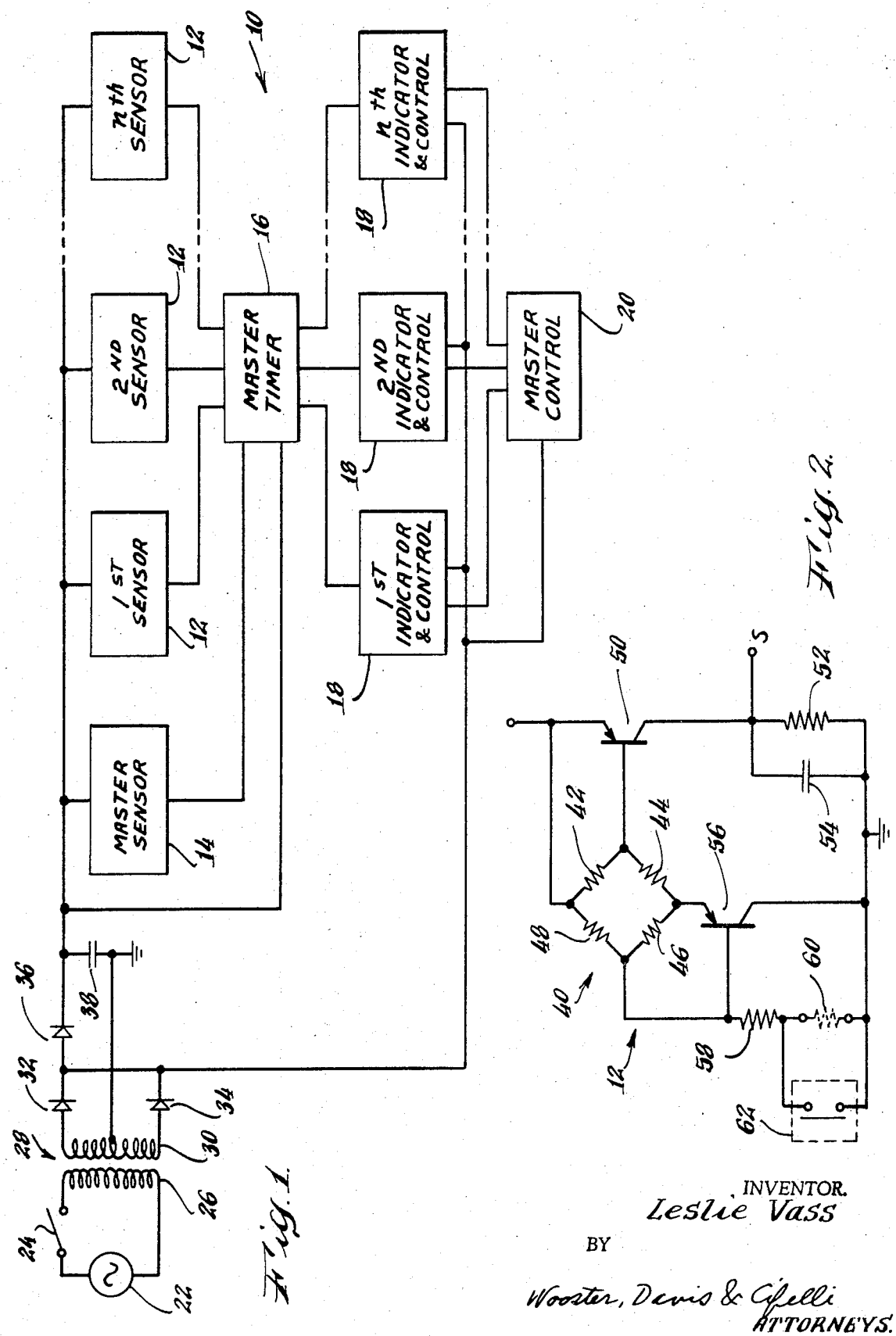

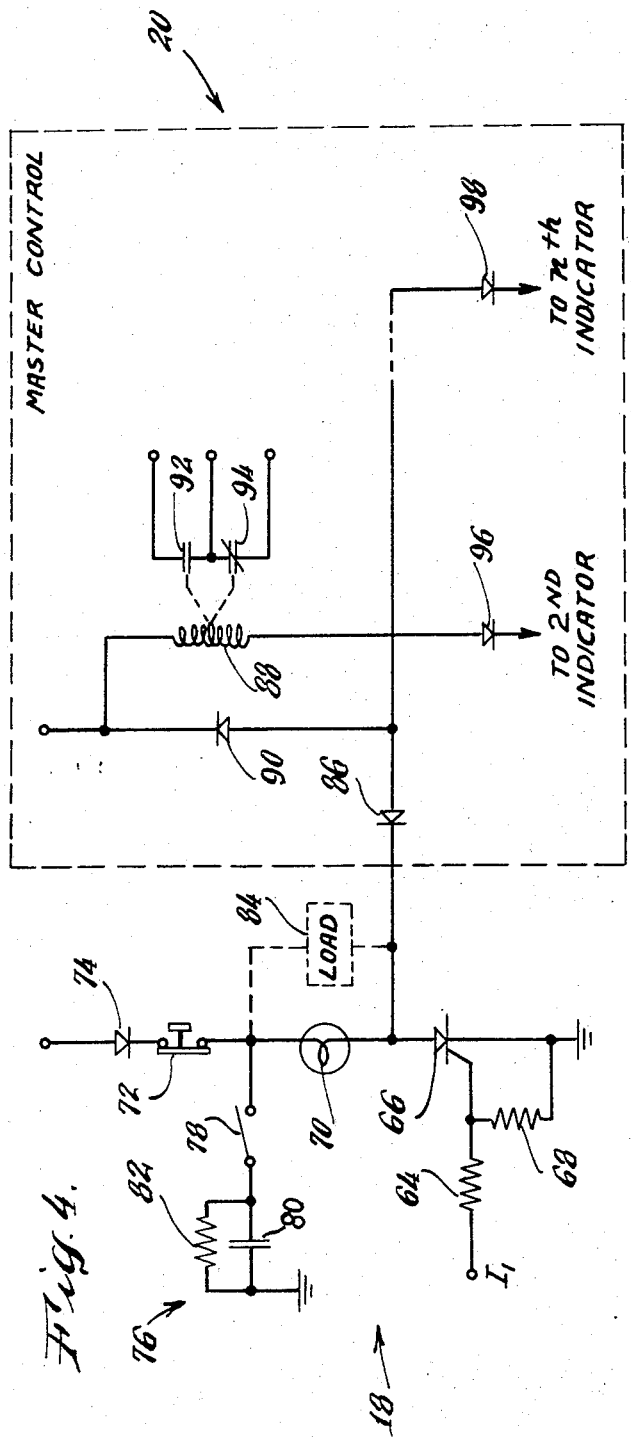
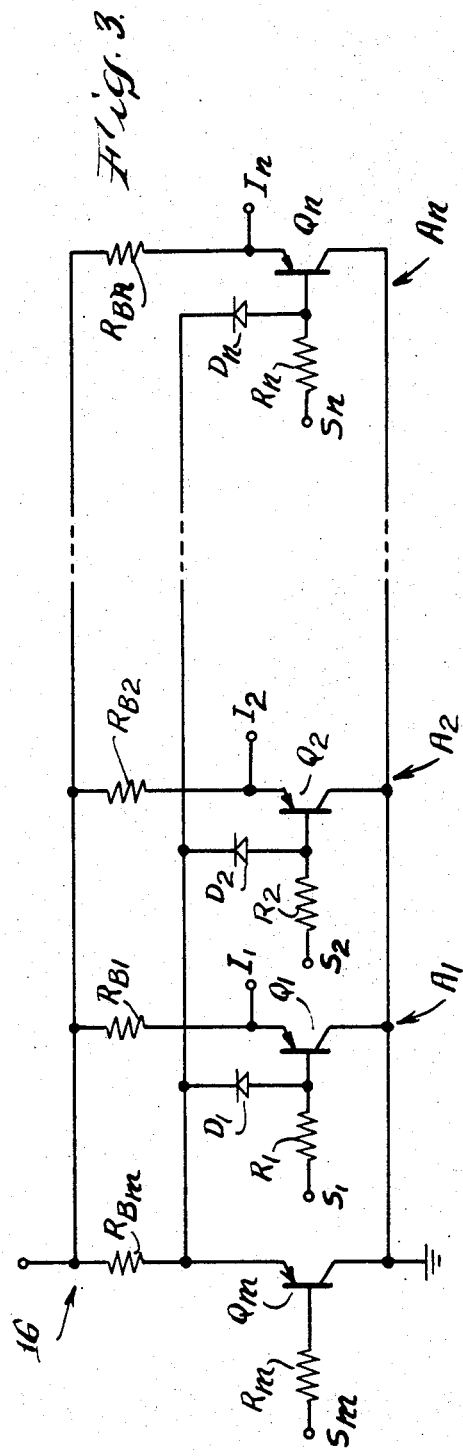
INVENTOR.
Leslie Vass
BY
Wooster, Davis & Cifelli
ATTORNEYS.

MONITORING SYSTEM

BACKGROUND OF THE INVENTION

This invention relates to a manufacturing flow monitoring system and more particularly to a flexible modular monitoring system which may be used for missing parts detection, sequence detection, counting, position sensing, sorting and pressure sensing.

Heretofore previously known electronic monitoring systems have typically been designed to accomplish a singular purpose, usually for a specific type of manufacturing process. These systems are limited in their ability to be expanded and cannot perform diverse functions, thus requiring a special design for each application and commercial marketing of a diverse number of systems. Furthermore, such systems in many applications lack the sensitivity necessary to provide accurate monitoring.

SUMMARY OF THE INVENTION

These problems and disadvantages of previously known systems are overcome by the present invention which provides a flexible modular monitoring system which can be readily adapted to perform various monitoring functions and which can be easily expanded to provide the necessary monitoring of a particular manufacturing process. This is accomplished in the present invention by providing a system including highly sensitive sensors adapted for both fluidic and electronic sensing, individual indicators for each sensor connected through a master timer to the respective sensors and a master control connected to each of the individual indicators. The individual sensors may be readily modified to provide AND, OR or NOR sensing functions between the fluidic and electronic sensing, and the individual indicators are adapted to operate in either a latch or nonlatching mode. The master timer may be connected to a master sensor or a clock to provide sequence and missing parts detection, or it may be effectively removed from the circuit when these functions are not desired. The master control may be arranged to give a visual or audible signal or it may stop the operation of the machine where the system is providing missing parts detection or the sequencing is improper.

It is, therefore, a general object of the present invention to provide a flow monitoring system which obviates and minimizes the disadvantages of the prior known systems.

It is a more specific object of the present invention to provide a monitoring system which includes a highly sensitive sensor.

It is another object of the present invention to provide a monitoring system which is flexible and can be utilized to provide diverse monitoring functions.

It is still another object of the present invention to provide a monitoring system which can be readily expanded to fit any particular manufacturing process.

It is a further object of the present invention to provide a monitoring system which provides individual indicators for the various sensors as well as a master control.

BRIEF DESCRIPTION OF THE DRAWINGS

These as well as other objects and advantages of the present invention will be readily apparent to those skilled in the art by reference to the appended claims and the following description when read in conjunction with the attached drawings in which:

FIG. 1 is a partial block diagram of the overall monitoring system of the present invention;

FIG. 2 is a schematic diagram of the sensor;

FIG. 3 is a schematic diagram of the master timer of the present invention; and

FIG. 4 is a schematic diagram of an indicator and master control of the present invention.

DETAILED DESCRIPTION OF THE PREFERRED EMBODIMENT

Referring to FIG. 1 the monitoring system of the present invention generally designated 10 includes a plurality of sensors 12 the number of which will be determined by the particular manufacturing process being monitored. To illustrate this flexibility in the number of sensors, the sensors 12 are labeled first, second and nth sensor. The monitoring system also includes a master sensor 14, which may be identical in structure to sensors 12, which provides a master timing function to selectively gate on a master timer 16 which is connected to receive an output signal from each of the sensors 12.

The master timer 16 provides a plurality of output signals, one for each sensor 12, which are supplied to a plurality of indicator and control blocks 18. A separate indicator and control block 18 is provided for each of the sensors 12, the number of which are determined by the particular application. As in the case of the sensors 12, the indicator control blocks 18 are labeled first, second and nth, each of which correspond to the similarly designated sensors 12. Output signals of the indicator and control blocks 18 are supplied to a master control 20 which, as will be described in greater detail hereinafter, may provide a counting function, a visual audible signal or may stop the operation of the machine, as required by the particular application.

The monitoring system is energized from a conventional AC 120 volt source 22 which is connected through an on-and-off switch 24 to the primary winding 26 of a transformer 28. The secondary winding 30 of the transformer 28 steps down the voltage to about 12 volts and is connected through diodes 32 and 34 which rectify the AC voltage to a DC voltage which is supplied to control the monitoring system 10. The sensors 12, master sensor 14 and the master timer 16 are isolated from the remaining system by a diode 36 and the voltage signal supplied to them is filtered by a capacitor 38. The indicator and control blocks 18 and master control 20 are energized directly across the rectifying diodes 32 and 34.

In operation, the sensors 12, as will be described in more detail hereinafter, sense the position or location of a part depending on the particular application of the monitoring system either by fluidic or electronic sensing, both, or some combination thereof and supply an output signal to the master timer 16. The master timer 16, under control of the master sensor 14, provides an output signal to a particular indicator and control block 18 when the signals from the master sensor 14 and the individual sensors 12 coincide. As mentioned previously, the master sensor may be identical to the sensors 12 in which case it could be programmed by a camming device or by a sensing supervisory function. The master sensor may also be a clock providing a signal of predetermined frequency for sequencing or timing functions or it can be connected to a constant signal so that the sensing of an event by any of the sensors 12 is effectively directly fed to the indicator and control blocks 18. In systems where timing and sequencing are not required, the master timer 16 and master sensor 14 could be eliminated and sensors 12 could be directly connected to their respective indicator and control blocks 18.

The indicator and control blocks 18, as will be described in greater detail hereinafter, include a visual signal for indicating the sensed event which is activated when a signal is received from its respective sensor 12 through the master timer 16. Alternatively, an audible signal could be provided. The indicator and control blocks 18 may also include an individually controlled relay or other switching device. The output signals derived from the indicator and control blocks 18 are supplied to the master control 20 which, according to the particular application, may operate an overall visual or audio alarm signal, stop the operation of the machine on the occurrence of a single sensed event or a combination thereof, or activate further operations such as the next manufacturing step.

Merely by way of an example, assume the monitoring system is set up to be a missing parts detector for a die cutting device in which a blank is fed sequentially through a number of stations for cutting and forming. The sensors 12 would be located at each operation station, and the master timer 16 would receive a signal from the master sensor 14 whenever the blanks should be at the particular stations. If the part were not present at the station, the individual sensor 12 would provide an output signal which would be coupled through the gated on master timer 16 to actuate the associated indicator and control block 18. This would indicate at which station the part was missing and the master control 20 could be actuated to perform the desired function, such as stopping the operation of the device. It will be apparent that numerous other monitoring operations could be conducted by the system as the permutations and combinations between the type of sensing and the master control can be widely varied.

Referring to FIG. 2, the sensors 12 comprise a resistance bridge 40 having resistors 42, 44, 46 and 48. Connected between the junction of resistors 42 and 44 is the base of a PNP transistor 50 the emitter of which is connected to the cathode of the diode 36. The cathode of the diode 36 is also connected to the junction between resistors 42 and 48. The collector of the transistor 50 is connected to one side of an output resistor 52 and a capacitor 54 connected in parallel to the resistor 52 to act as a noise filter. The other terminals of the resistor 52 and the capacitor 54 are connected to ground.

The junction of resistors 44 and 46 is connected to the emitter of a second PNP transistor 56 the collector of which is connected to ground and the base of which is connected to the junction of resistors 46 and 48 and also to one end of a resistor 58. The opposite end of the resistor 58, as shown in FIG. 2, is connected to a resistance probe 60 and a pressure switch 62 connected in parallel. The pressure switch 62 may be a Fairchild PSF 100A from Fairchild Controls, Incorporated, Long Island, New York, in which a predetermined pressure closes a normally open contact between ground and the resistor 58. The resistance probe 60 is highly sensitive sensing any input less than 300 kilohms between the probe ends.

In the configuration of FIG. 2 an OR gate function is derived with either the pressure switch 62 or the resistance probe 60 actuating the sensor. If an AND gate function were desired, the pressure switch 62 and resistance probe 60 could be connected in series. If a NOR gate function were desired, the pressure switch 62 could be connected between the junction of resistors 46 and 48 of the resistance bridge 40 and the base of the transistor 56. As shown in FIG. 2, if a resistance less than 300 kilohms or a pressure sufficient to close the normally open contacts of the pressure switch 62 is present, the resistance between ground and the resistor 58 unbalances the resistance bridge 40 sufficiently to switch on the transistor 56. This amplifies the unbalance to turn on the transistor 50, which causes the voltage across the output resistor 52 to increase from its normal value of about 1 volt to in excess of 8 volts to provide an output signal to the master timer 16 and subsequently to its respective indicator and control block 18 and to the master control 20.

Referring to FIG. 3, the master timer provides essentially an AND function between the master sensor output signal and the individual sensors 12 output signals. It does this by providing AND gates $A_1$, $A_2$, ... $A_n$ between the master sensor signal and the output signals of the individual, first, second and nth sensors 12. The output signal from the master sensor 14, identified in FIG. 3 as $S_m$, is supplied through a resistor $R_m$ to base of a PNP transistor $Q_m$. Similarly, the signals from the sensors 12, which are identified as $S_1$, $S_2$, and $S_n$, are supplied through resistors $R_1$, $R_2$ and $R_n$ to the bases of PNP transistors $Q_1$, $Q_2$, and $Q_n$. The emitters of each of the transistors $Q_1$, $Q_2$ and $Q_n$ are individually connected through bias resistors $R_{b1}$, $R_{b2}$, and $R_{bn}$ to the cathode of the diode 36 of FIG. 1. The collectors of the transistors $Q_m$, $Q_1$, $Q_2$ and $Q_n$ are all connected to ground. The bases of transistors $Q_1$, $Q_2$ and $Q_n$ are also connected to diodes $D_1$, $D_2$ and $D_n$ the cathodes of which are connected to the emitter of the transistor $Q_m$. The output signals of each of the AND gates $A_1$, $A_2$ and $A_n$ are taken from the emitters of transistors $Q_1$, $Q_2$ and $Q_n$ as identified by terminals $I_1$, $I_2$ and $I_n$ which are connected to their respective indicator and control blocks 18.

In operation, transistors $Q_m$, $Q_1$, $Q_2$ and $Q_n$ are normally biased on leaving the output signals $I_1$, $I_2$ and $I_n$ at approximately 1 volt. The signal $S_m$ from the master sensor 14 cuts off the transistor $Q_m$ thereby raising the voltage at its emitter to about 9 volts and back biasing diodes $D_1$, $D_2$ and $D_n$. The transistors $Q_1$, $Q_2$ and $Q_n$ still remain on as long as there are no input signals $S_1$, $S_2$ and $S_n$. If, however, the sensor 12 provides an output signal S which is a positive voltage applied to the base of its respective AND gate transistor $Q_1$, $Q_2$ or $Q_n$ that transistor will be cut off thereby increasing its output signal $I_1$, $I_2$ or $I_n$ to about 8 volts, the level necessary to actuate its indicator and control block 18.

Referring to FIG. 4, the indicator and control blocks 18 and the master control 20 will now be described in detail. Only the indicator and control block 18 for the first sensor is shown inasmuch as the remaining indicator and control blocks 18 are identical. The output signal $I_1$ from AND gate $A_1$ is connected to one end of a resistor 64 the opposite end of which is connected to the gate of silicon controlled rectifier 66. Also connected to the other end of the resistor 64 is a resistor 68 which is connected to ground and which forms a voltage divider with the resistor 64. The anode of the SCR 66 is connected through an indicator lamp 70 which is connected in series with a reset switch 72 and the cathode of a diode 74 the anode of which is connected to the output of rectifying diodes 32 and 34 in FIG. 1. Connected between the reset switch 72 and the indicator lamp 70 is a memory section 76 which includes a switch 78, a capacitor 80 connected between the switch and ground and a resistor 82 connected in parallel across capacitor 80. A load 84, such as a relay coil or other control means, may be connected in parallel across the indicator lamp 70.

The anode of SCR 66 is also connected to the cathode of a diode 86 the anode of which is connected to one end of a relay coil 88 of the master control 20. The other end of the relay coil 88 is connected to the rectifying diodes 32 and 34 of FIG. 1. A diode 90 is connected with its anode to the anode of diode 86 and its cathode to the rectifying diodes 32 and 34 to prevent back swing when the voltage collapses in the relay coil 88. The relay coil 88 may control various configurations of contacts which, for example are shown in FIG. 4, includes a normally open and normally closed contacts 92 and 94 respectively. These contacts may operate to initiate energization of further processing equipment, shut off the equipment being monitored or actuate visual or audial alarms as desired for the particular applications. Other indicator and control blocks 18 are similarly connected to the relay coil 88 through diodes 96 and 98, it being understood that a diode would be provided for each of the indicators being used in the system.

In operation, when the output signal $I_1$ is derived through the master timer indicating the presence of the master sensor 14 output signal and first sensor 12 output signal, it will be sufficient to gate on the SCR 66 to allow current to flow from the rectifying diodes 32 and 34 through diode 74, which functions to isolate the indicator section from other sections, the normally closed reset switch 72, and the indicator lamp 70 thereby illuminating it. This current would also flow through the load 84 if such is connected.

If the switch 78 is in its open position, the indicator will be in its nonlatching mode thereby allowing the anode voltage across the SCR 66 to drop sufficiently to cut it off once the signal $I_1$ on the gate of the SCR 66 is no longer present. If it is desired in the particular application to maintain the indicator on once the condition has been sensed, the switch 78 can be closed thereby allowing capacitor 80 to be charged from the source voltage to maintain the anode voltage of the SCR 66 sufficiently high to keep it on even when the gating signal is removed. If the switch 78 is on for the latching or memory mode and it is desired to reset the indicator, push button 72 may be actuated to disconnect the capacitor 80 from the source voltage and the capacitor 80 will discharge rapidly through the resistor 76 to ground.

When the SCR 66 is turned on, it will close a path from the source voltage through the relay coil 88 and the diode 86 to ground thereby controlling the contacts 92 and 94 to close and open respectively, thereby initiating the control action. As will readily be apparent, the same actuation of the relay coil 88 will occur when the other indicator and control blocks 18 are actuated to provide a closed loop through the diodes 96 and 98.

Although the values of the various circuit elements will be readily apparent to one skilled in the art and may be varied for different applications, by way of example the monitoring system has been successfully operated utilizing the following values:

Diodes 32, 34, 36, 74, 86, 90, 96, 98 IN 4004
PNP Transistors 50, 56, $Q_m$, $Q_1$, $Q_2$, $Q_n$ 2N3638
Diodes $D_1$, $D_2$, $D_n$ IN 457
SCR 66 – GE C6B
Indicating Lamp 70 – 14V, 80ma
Resistors $R_{b1}$, $R_{b2}$, $R_{bn}$ – 2.7KΩ
Resistors $R_{bm}$, 52, 82 – 10KΩ
Resistors $R_1$, $R_2$, $R_n$ – 4.7KΩ
Resistor $R_m$ – 1.8KΩ
Resistor 42 – 100KΩ
Resistors 44, 58 – 18KΩ
Resistors 46, 48 – 220KΩ
Resistors 64, 68 – 1.5KΩ
Capacitors 38, 80 – 40μf
Capacitor 54 – 0.1μf
Pressure Switch 62 – PSF 100A – Fairchild Controls
Transformer 28 – 115/12 Center tap Thus, the present invention has provided an improved highly sensitive and flexible modular monitoring system which can perform a large variety of monitoring functions and can be readily adapted and expanded to suit any particular manufacturing process which is to be monitored. The many permutations and combinations available within the sensors themselves and as combined with the master timer and master control will be readily apparent to those skilled in the art.

It will be understood by those skilled in the art that a number of variations and modifications may be made in this invention without departing from its spirit and scope. Accordingly, the foregoing description should be construed as illustrative only rather than limiting.

What is claimed is:

1. A monitoring system comprising:
   a plurality of highly sensitive sensor means each of which are positioned to sense a particular predetermined condition; a plurality of indicator means each of which are connected to individual ones of said plurality of sensor means for giving an indication of the occurrence of the particular predetermined condition of its associated sensor means, each of said indicator means including means for providing an output signal indicative of the occurrence of the particular predetermined condition; and
   master control means connected to each of said plurality of indicator means to receive each of said output signals therefrom and to initiate a predetermined control upon the receipt of said output signals.

2. The system of claim 1 further including a master timer means connected between said plurality of sensor means and said plurality of indicator means for providing signals representative of sensed conditions from said sensor means to their respective indicator means only when a master signal is supplied to said master timer means.

3. The system of claim 2 wherein said master signal is derived from a master sensor.

4. The system of claim 2 wherein said master timer means comprises a plurality of AND gates each of which includes:
   a first input connected to the outputs of said plurality of sensor means;
   a second input connected to said master signal; and
   an output connected to the individual one of said plurality of indicator means with which it is associated.

5. The system of claim 4 wherein each of said plurality of sensor means includes:
   sensing means for sensing the existence of a predetermined condition;
   resistance bridge means connected to said sensing device means which becomes unbalanced when the predetermined condition is sensed;
   amplifier means connected to said resistance bridge means for amplifying the unbalancing of said resistance bridge means; and
   electronic switch means connected to said resistance bridge means for providing an output signal when the predetermined condition is sensed.

6. The system of claim 1 wherein each of said plurality of indicator means includes an illuminating means connected between a source of voltage and a normally open electronic switch; and
   wherein a signal from said individual one of said plurality of sensors with which said indicator means is associated is connected to turn said electronic switch on thereby closing a path through said illuminating means causing it to be energized.

7. The system of claim 6 wherein each of said indicator means further includes a memory section which may be selectively connected to said electronic switch to maintain said electronic switch on after the signal from the associated individual sensor means indicating a sensed condition terminates.

8. The system of claim 7 wherein said memory section includes a capacitor adapted to be charged from a source of voltage, a reset switch for disconnecting the capacitor from said source voltage and a resistor connected in parallel to said capacitor for discharging said capacitor.

9. The system of claim 8 wherein each of said plurality of sensor means includes:
   sensing means for sensing the existence of a predetermined condition;
   resistance bridge means connected to said sensing device means which becomes unbalanced when the predetermined condition is sensed;
   amplifier means connected to said resistance bridge means for amplifying the unbalancing of said resistance bridge means; and
   electronic switch means connected to said resistance bridge means for providing an output signal when the predetermined condition is sensed.

10. The system of claim 1 wherein each of said plurality of sensor means includes:
    sensing means for sensing the existence of a predetermined condition;
    resistance bridge means connected to said sensing device means which becomes unbalanced when the predetermined condition is sensed;
    amplifier means connected to said resistance bridge means for amplifying the unbalancing of said resistance bridge means; and
    electronic switch means connected to said resistance bridge means for providing an output signal when the predetermined condition is sensed.

11. The system of claim 10 wherein said sensing means is a pressure switch.

12. The system of claim 10 wherein said sensing means is a resistance probe.

* * * * *